(12) United States Patent
Pattan et al.

(10) Patent No.: US 11,871,304 B2
(45) Date of Patent: Jan. 9, 2024

(54) SYSTEM AND METHOD FOR SYNCHRONIZING A GROUP INFORMATION BETWEEN A UE AND A SEAL SERVER

(71) Applicant: Samsung Electronics Co., Ltd., Suwon-si (KR)

(72) Inventors: Basavaraj Jayawant Pattan, Bangalore (IN); Sapan Pramodkumar Shah, Bangalore (IN); Narendranath Durga Tangudu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 17/493,110

(22) Filed: Oct. 4, 2021

(65) Prior Publication Data

US 2022/0109964 A1   Apr. 7, 2022

(30) Foreign Application Priority Data

Oct. 5, 2020   (IN) .............................. 202041043273
Sep. 15, 2021  (IN) .............................. 2020 41043273

(51) Int. Cl.
*H04W 12/76* (2021.01)
*H04W 72/121* (2023.01)
*H04W 4/08* (2009.01)

(52) U.S. Cl.
CPC .................................... *H04W 4/08* (2013.01)

(58) Field of Classification Search
CPC ....... H04W 4/08; H04W 12/55; H04W 12/76; H04W 72/121
See application file for complete search history.

(56) References Cited

U.S. PATENT DOCUMENTS

| 7,738,899 B1* | 6/2010 | Manroa ................ G06Q 10/10 455/412.2 |
| 2007/0168332 A1* | 7/2007 | Bussard ................ H04L 12/185 |

(Continued)

OTHER PUBLICATIONS

3GPP; TSG SA; Service Enabler Architecture Layer for Verticals (SEAL); Functional architecture and information flows; (Release 16), 3GPP TS 23.434 V16.5.0, Sep. 24, 2020.

(Continued)

*Primary Examiner* — Andrew Wendell
(74) *Attorney, Agent, or Firm* — Jefferson IP Law, LLP (57) ABSTRACT

A communication method and system for converging a 5$^{th}$-Generation (5G) communication system for supporting higher data rates beyond a 4$^{th}$-Generation (4G) system with a technology for Internet of Things (IoT) are provided. The embodiments herein disclose a method performed by a service enabler architecture layer (SEAL) server in a wireless communication system, the method comprising receiving, from a SEAL client, a group creation request; performing group creation based on the group creation request, creating group information during the group creation, transmitting, to a vertical application layer (VAL) server, group creation notification, and in response to receiving the group creation request, transmitting, to the SEAL client, a group creation response. The group creation notification comprises an identity list.

15 Claims, 7 Drawing Sheets

(56) References Cited

U.S. PATENT DOCUMENTS

| | | | |
|---|---|---|---|
| 2008/0008106 A1* | 1/2008 | Boberg | H04L 12/185 370/270 |
| 2010/0146065 A1* | 6/2010 | Zhu | G06Q 10/107 709/206 |
| 2018/0109929 A1* | 4/2018 | Ly | H04W 4/06 |
| 2018/0307550 A1 | 10/2018 | Parikh et al. | |
| 2019/0028866 A1* | 1/2019 | Baek | H04W 4/70 |
| 2020/0178052 A1* | 6/2020 | Pattan | H04L 41/5051 |
| 2021/0007178 A1* | 1/2021 | Pattan | H04W 60/06 |
| 2022/0055747 A1* | 2/2022 | Zhao | H04W 64/003 |
| 2022/0291678 A1* | 9/2022 | El Essaili | H04L 67/14 |
| 2022/0369221 A1* | 11/2022 | Pateromichelakis | H04L 41/0895 |
| 2023/0037031 A1* | 2/2023 | Wang | H04W 8/08 |

OTHER PUBLICATIONS

3GPP; TSG SA; Study on support of the 5GMSG Service; (Release 17), 3GPP TR 23.700-24 V1.0.0, Sep. 13, 2020.
3GPP; TSG SA; Message Service within the 5G System; Stage 1 (Release 16), 3GPP TS 22.262 V16.0.0, Jan. 4, 2019.
International Search Report and Written Opinion dated Jan. 17, 2022, issued in International Patent Application No. PCT/KR2021/013629.

* cited by examiner

SYSTEM AND METHOD FOR SYNCHRONIZING A GROUP INFORMATION BETWEEN A UE AND A SEAL SERVER

CROSS-REFERENCE TO RELATED APPLICATION(S)

This application is based on and claims priority under 35 U.S.C. § 119(a) of an Indian Provisional patent application number 202041043273 (PS), filed on Oct. 5, 2020 in the Indian Intellectual Property Office, and of an Indian Complete patent application number 202041043273 (CS), filed on Sep. 15, 2021 in the Indian Intellectual Property Office, the disclosure of each of which is incorporated by reference herein in its entirety.

BACKGROUND

1. Field

The disclosure relates to Service Enabler Architecture Layer (SEAL) server. More particularly, the disclosure relates to a system and method for enabling synchronizing a group information between a UE and a SEAL client.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long-term evolution (LTE) System'. The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, a vertical domain is an industry or group of enterprises in which similar products or services are developed, produced, and provided. 3' Generation Partnership Project (3GPP) is defining multiple verticals like Vehicle to everything (V2XAPP), $5^{th}$ Generation (5G) Messaging Architecture (5GMARCH), unmanned aerial vehicle (UASAPP) and Factories of the Future (FFAPP). A Service Enabler Architecture Layer (SEAL) is an enabling layer architecture which provides set of common services to multiple verticals. The common services include group management, configuration management, location management, identity management, key management and network resource management. The vertical service provider can decide to use one or more services from SEAL.

In particular, SEAL group management service offers multiple features and capabilities to manage groups—like creating group, modifying group configuration, modifying membership of the group, creating dynamic group, creating location based group, subscribing to group change event, etc. Although, the SEAL group management offers multiple capabilities there is no procedure which supports fetching of list of groups where the vertical application layer (VAL) user is member of. Also, there is no procedure which supports sending group creation notifications to the VAL users who do not support SEAL clients.

Thus, it is desired to address the above mentioned disadvantages or other shortcomings or at least provide a useful alternative The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and method to make vertical application layer (VAL) client aware of group information.

Another aspect of the disclosure is to provide a method and device for synchronization of group creation information between the server and the client.

Additional aspects will be set forth in part in the description which follows and, in part, will be apparent from the description, or may be learned by practice of the presented embodiments.

In accordance with an aspect of the disclosure, a method for synchronizing a group information between a User Equipment (UE) and a Service Enabler Architecture Layer (SEAL) server is provided. The method includes sending, by a SEAL client in the UE, a group creation request to the SEAL server, creating, by the SEAL server, the group based on the group creation request and storing information associated with the group comprising group identity, a list of members of the group, group policy, group configuration and the like, sharing, by the SEAL server, a group creation notification to a VAL server and a VAL client. The notification comprises information associated with the group and a list of members of the group, and receiving, by the SEAL client in the UE, a group creation request from the SEAL server upon successful creation of the group.

In an embodiment, the sharing, by the SEAL server, the group creation notification to the VAL server further comprises determining, by the VAL server, whether the list of group members received comprises a 3GPP UE, and sending, by the VAL server, the group notification to the 3GPP message gateway in response to determining that the list of group members received comprises the 3GPP UE. Further, the 3GPP Message Gateway sends the group notification received from the SEAL server to the 3GPP UE.

In an embodiment, the 3GPP Message Gateways are of two types the Legacy 3GPP Message Gateway and the Non-3GPP Message Gateway.

In another embodiment sharing, by the SEAL server, the group creation notification to the VAL server further comprises determining, by the VAL server, whether the list of group members received comprises a Non-GPP UE, and sending, by the VAL server, the group notification to the Non-3GPP message gateway in response to determining that the list of group members received comprises the Non-3GPP UE. Further, the Non-3GPP Message Gateway sends the group notification received from the SEAL server to the Non-3GPP UE In an embodiment, the method further comprises sending, by a MSGin5G client, a group list fetch request to a SEAL client for sharing a list of groups for which the UE is a member. The request comprises a MSGin5G service ID, sharing, by the SEAL client, the group list fetch request to the SEAL server, receiving, by the SEAL client, a group list fetch response comprising the list of group for which the UE is the member from the SEAL server in response to receiving the group list fetch request, and notifying, by the SEAL client, the list of group to the MSGin5G client.

In accordance with another aspect of the disclosure, a wireless system is provided. The wireless system includes a User Equipment UE in communication with a MSGin5G server and a Service Enabler Architecture Layer (SEAL) server, the UE comprising a SEAL client; a MSGin5G client; a memory; and a processor. The SEAL client being configured to send a group creation request to the SEAL server, and receive a group creation response from the SEAL server in response to the group creation request upon successful creation of the group. The SEAL server is configured to create a VAL group based on the group creation request and storing information associated with the group, and share the group creation notification toe a MSGin5G server and a MSGin5G client. The notification comprises information associated with the VAL group and a list of members of the VAL group.

Other aspects, advantages, and salient features of the disclosure will become apparent to those skilled in the art from the following detailed description, which, taken in conjunction with the annexed drawings, discloses various embodiments of the disclosure.

In accordance with another aspect of the disclosure, a method is provided. A method performed by a service enabler architecture layer (SEAL) server in a wireless communication system, the method comprising: receiving, from a SEAL client, a group creation request; performing group creation based on the group creation request; creating group information during the group creation; transmitting, to a messaging for massive internet of things in 5G network (MSGin5G) server, a group creation notification; and in response to receiving the group creation request, transmitting, to the SEAL client, a group creation response, wherein the group creation notification comprises an identity list.

In an embodiment, the method further comprising storing the group information.

In an embodiment, the method further comprising transmitting, to at least one member included in the created group, a group notification, wherein the group notification includes group configuration information.

In an embodiment, the method further comprising receiving, from the SEAL client, a group list fetch request; checking authorization of the group list fetch request; and transmitting, to the SEAL client, a group list fetch response comprising a list of groups in which a messaging for massive internet of things in 5G network (MSGin5G) client identifier (ID) is a member in response to receiving the group list fetch request.

In an embodiment, wherein the group list fetch response comprises at least one of a MSGin5G service ID or a group service ID.

In accordance with another aspect of the disclosure, a method is provided. A method performed by a messaging for massive internet of things in 5G network (MSGin5G) server in a wireless communication system, the method comprising: receiving, from a service enabler architecture layer (SEAL) server, a group creation notification, wherein the group creation notification comprises an identity list.

In an embodiment, the method further comprising determining whether the identity list includes at least one legacy 3rd Generation Partnership Project (3GPP) user equipment (UE); and in response to determining that the identity list includes the at least one legacy 3GPP UE, transmitting a group notification message to legacy 3GPP UE gateway via legacy 3GPP gateway.

In an embodiment, wherein the group notification message comprises at least one of a MSGin5G server address, a list of MSGin5G service identifier (ID), a message ID, an application ID, a group ID, a list of members, or a group configuration.

In an embodiment, the method further comprising determining whether the identity list includes at least one non-3rd Generation Partnership Project (3 GPP) user equipment (UE); and in response to determining that the identity list includes the at least one non-3GPP UE, transmitting a group notification message to a non-3GPP UE gateway via legacy non-3GPP gateway.

In an embodiment, wherein the group notification message comprises at least one of a MSGin5G server address, a MSGin5G service identifier (ID), a message ID, an application ID, a group ID, a list of members, or a group configuration.

In accordance with another aspect of the disclosure, a method is provided. A method performed by a service enabler architecture layer (SEAL) client in a wireless communication system, the method comprising: transmitting, to a SEAL server, a group creation request; and in response to transmitting the group creation request, receiving, from the SEAL server, a group creation response.

In an embodiment, the method further comprising receiving, from a messaging for massive internet of things in 5G network (MSGin5G) client, a group list request, wherein the group list request comprises a MSGin5G service identifier (ID); transmitting, to the SEAL server, a group list fetch request; in response to transmitting the group list fetch request, receiving, from the SEAL server, a group list fetch response comprising a list of group for which the MSGin5G client is a member; and transmitting, to the MSGin5G client, a group list notification.

In accordance with another aspect of the disclosure, a service enabler architecture layer (SEAL) server is provided. The SEAL server comprises transceiver; and at least one processor configured to: receive, from a SEAL client, a group creation request, perform group creation based on the group creation request, create group information during the group creation; transmit, to a messaging for massive internet of things in 5G network (MSGin5G) server, group creation notification; and in response to receiving the group creation request, transmit, to the SEAL client, a group creation response, wherein the group creation notification comprises an identity list.

In an embodiment, the at least one processor is further configured to store the group information, and transmit, to at least one member included in the created group, a group notification, and wherein the group creation notification includes group configuration information.

In an embodiment, the at least one processor is further configured to receive, from the SEAL client, a group list fetch request, check authorization of the group list fetch request, and transmit, to the SEAL client, a group list fetch response comprising a list of groups in which a messaging for massive internet of things in 5G network (MSGin5G) client identifier (ID) is a member in response to receiving the group list fetch request.

In accordance with another aspect of the disclosure, a messaging for massive internet of things in 5G network (MSGin5G) server is provided. The MSGin5G server comprises transceiver; and at least one processor configured to: receive, from a service enabler architecture layer (SEAL) server, a group creation notification, wherein the group creation notification comprises an identity list.

In an embodiment, the at least one processor is further configured to determine whether the identity list includes at least one legacy 3rd Generation Partnership Project (3GPP) user equipment (UE), and in response to determining that the identity list includes the at least one legacy 3GPP UE, transmit a group notification message to legacy 3GPP UE gateway, wherein the group notification message comprises at least one of a MSGin5G server address, a list of MSGin5G service identifier (ID), a message ID, an application ID, a group ID, a list of members, or a group configuration.

In an embodiment, the at least one processor is further configured to determine whether the identity list includes at least one non-3rd Generation Partnership Project (3GPP) user equipment (UE), and in response to determining that the identity list includes the at least one non-3GPP UE, transmit a group notification message to a non-3GPP UE gateway, wherein the group notification message comprises at least one of a MSGin5G server address, a MSGin5G service identifier (ID), a message ID, an application ID, a group ID, a list of members, or a group configuration.

In accordance with another aspect of the disclosure, a service enabler architecture layer (SEAL) client is provided. The SEAL client comprises transceiver; and at least one processor, wherein the at least one processor is configured to: transmit, to a SEAL server, a group creation request, and in response to transmitting the group creation request, receive, from the SEAL server, a group creation response.

In an embodiment, the at least one processor is further configured to receive, from a messaging for massive internet of things in 5G network (MSGin5G) client, a group list request, wherein the group list request comprises a MSGin5G service ID, transmit, to the SEAL server, a group list fetch request, in response to transmitting the group list fetch request, receive, from the SEAL server, a group list fetch response comprising a list of group for which the MSGin5G client is a member, and transmit, to the MSGin5G client, a group list notification.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiment herein is to provide a system and method to make a vertical application layer (VAL) client aware of group information. The proposed method provides procedures for VAL client to fetch the list of groups to which it has membership, with help of a Service Enabler Architecture Layer (SEAL) client. Further, the proposed method provides procedures for sending notifications to the group members who do not have SEAL clients available with them.

Referring now to the drawings, and more particularly to FIGS. 1 through 7, where similar reference characters denote corresponding features consistently throughout the figures, there are shown preferred embodiments.

Figure 1:
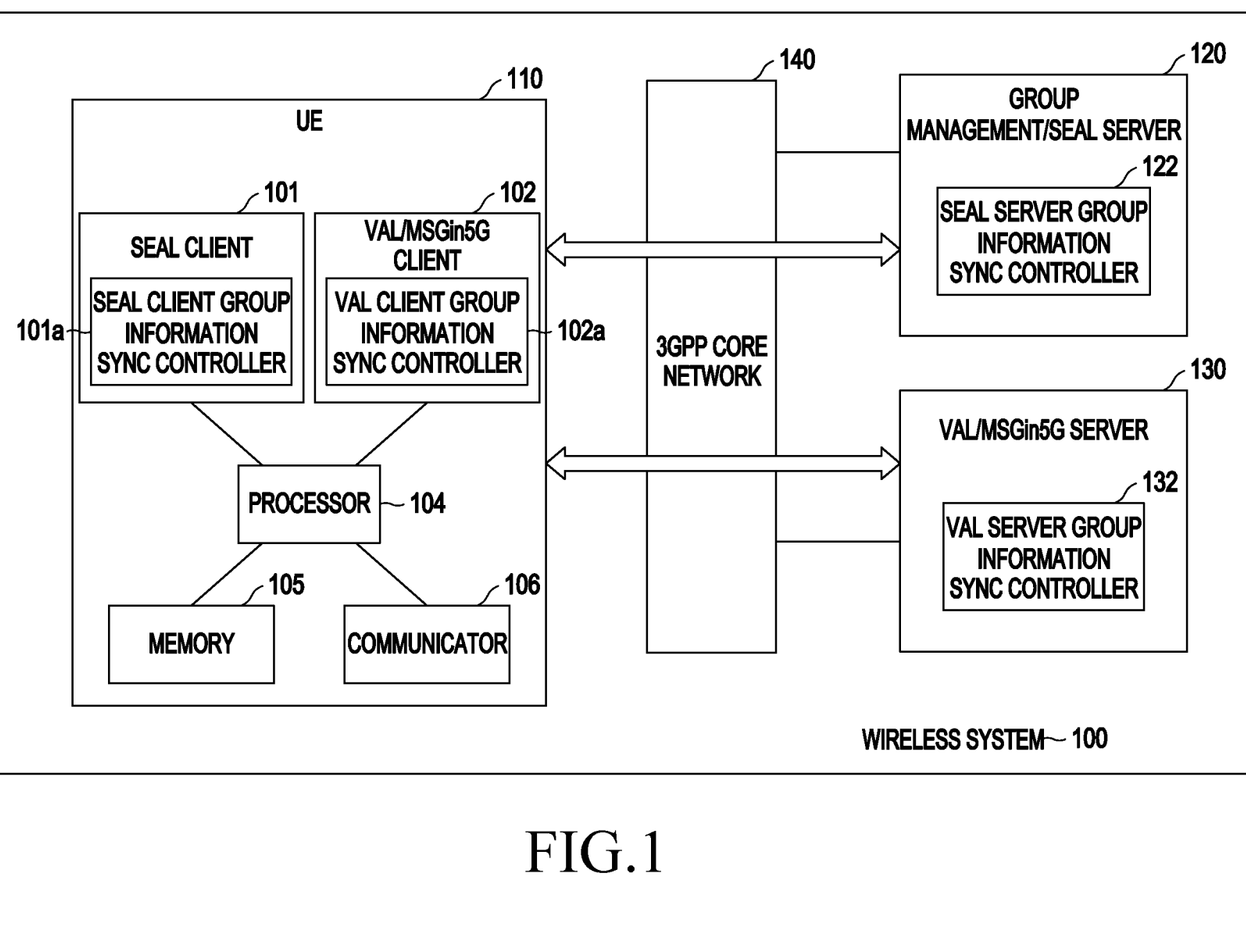
FIG. 1 is a block diagram illustrating a UE in communication with a SEAL server and a VAL server for synchronization of group information, according to an embodiment of the disclosure.

FIG. 1 is a block diagram illustrating a User Equipment (110) in communication with a SEAL server (120) and a VAL server (130) for synchronization of group information between the UE (110), the VAL server (130) and the SEAL server (120) in a wireless system (100), according to an embodiment of the disclosure.

Referring to FIG. 1, the UE (110) is communicating with the SEAL server (120) and the VAL server (130) over a 3GPP network (140). The UE (110) comprises a SEAL Client (101), a VAL client (102), a memory (105), a processor (104) and a communicator (106).

The SEAL client (101) comprises a SEAL Client group information sync controller (101a) for synchronizing group information based on the SEAL client (101) instructions.

The SEAL server (120) comprises a SEAL server group information sync controller (122) for synchronizing group information based on the SEAL server (120) instructions.

In an embodiment, the VAL client (102) is a MSGin5G client and the VAL server (130) is a MSGin5G server. The SEAL server (120) may comprise a group management server and the SEAL client (101) comprises a group management client.

The VAL client (102) comprises a VAL Client group information sync controller (102a) for synchronizing group information based on the VAL client (102) instructions.

The VAL server (130) comprises a VAL server group information sync controller (132) for synchronizing group information based on the VAL server (130) instructions.

The VAL Client group information sync controller (102a), the VAL server group information sync controller (132), the SEAL Client server information sync controller (101a), the SEAL server group information sync controller (122), are implemented by processing circuitry such as logic gates, integrated circuits, microprocessors, microcontrollers, memory circuits, passive electronic components, active electronic components, optical components, hardwired circuits, or the like, and may optionally be driven by firmware. The circuits maybe, for example, be embodied in one or more semiconductor chips, or on substrate supports such as printed circuit boards and the like.

The memory (105) stores instructions to be executed by the processor (104) for synchronization of group information between the UE (110), the VAL server (130) and the SEAL server (120). The memory (105) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

In addition, the memory (105) may, in some examples, be considered a non-transitory storage medium. The term "non-transitory" may indicate that the storage medium is not embodied in a carrier wave or a propagated signal. However, the term "non-transitory" should not be interpreted that the memory (105) is non-movable. In some examples, the memory (105) can be configured to store larger amounts of information than the memory. In certain examples, a non-transitory storage medium may store data that can, over time, change (e.g., in Random Access Memory (RAM) or cache). The memory (105) can be an internal storage or it can be an external storage unit of the UE (110), a cloud storage, or any other type of external storage.

In an embodiment, the processor (104) communicates with the SEAL client (101), the VAL client (102), the memory (105), and the communicator (106). The processor (104) is configured to execute instructions stored in the memory (105) for synchronization of group information between the UE (110), the VAL server (130) and the SEAL server (120). The processor (104) may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In an embodiment, the communicator (106) is configured for communicating internally between internal hardware components and with external devices via one or more networks. The communicator (106) includes an electronic circuit specific to a standard that enables wired or wireless communication.

In an embodiment the proposed method and UE (110) provides different scenarios where synchronization of group information is provided between the UE (110) and the SEAL server (120) and the VAL/MSGin5G Server (130).

In an embodiment, when the UE (110) is in offline mode or in power saving mode, the UE (110) may not be aware about newly created or deleted MSGin5G groups in which the UE (110) or a user of the UE (110) is a member. In this procedure, the MSGin5G client (102) send a group list fetch request to the SEAL client (101) for retrieving information about the groups handled by the SEAL client (101).

Upon receiving the group list fetch request, the SEAL client (101) forwards the group list fetch request to the SEAL server (120).

In response to receiving the group list fetch request, the SEAL server (120) checks the authorization of the group list fetch request and if authorized (120) the SEAL server (120) shares a group list fetch response with the SEAL client (101). Further, the SEAL client (101) notifies the group list fetch response to the UE (110).

The group list fetch response comprises the UE ID/MSGin5G service ID (VAL User) for whom group list fetch request is received, a list of Group service ID (VAL groups) for which the MSGin5G service ID (VAL User/UE ID) is member and a result indicating success or failure. In an embodiment, the SEAL client (101) notifies the list of Group service ID for which the MSGin5G service ID (VAL User/UE ID) is member to the UE (110).

In an embodiment, the pre-conditions for a group to be entered in the group list are as follows: The group is previously defined on the SEAL server (120) including a list of users of the group. The List of groups to which a VAL UE/VAL User belongs to is known to the SEAL server (120) for each of the VAL UE/VAL User. The MSGin5G UE (110) (i.e., VAL user) has not received group announcement message as it is offline Another scenario is of sharing group creation notification. Pre-conditions for the scenario are as follows: The SEAL client (101), the SEAL server (120), the MS Client (102), the MS server (130) and the group members belong to a same VAL system. The authorized VAL user/UE/administrator (110) is aware of the user's identities which will be constituted to form the VAL group.

The SEAL client (101) of an authorized UE (110) requests a group create operation to the SEAL server (120). During the group creation, the SEAL server (120) creates and stores the information of the created group. Further, the SEAL server (120) conditionally notify the VAL/MSGin5G server regarding the group creation with the information of the group members. The VAL group members of the VAL group are notified about the newly created VAL group configuration data. Further, the SEAL server (120) provides a group creation response to the SEAL client (101) of the administrator/authorized VAL user/UE.

Another scenario is of sharing group creation notification when the group members (UE) (110) does not include SEAL client (101). Pre-conditions for the scenario are as follows: The MSGin5G Server (130) interacts with the SEAL Server (120) using the procedures over SEAL-S reference point. The MSGin5G Server (130) is aware of a legacy 3GPP message client (e.g., SMS client) in legacy 3GPP UE and interacts with it via Legacy 3GPP Message Gateway. The MSGin5G Server (130) is aware of the Non-3GPP message client in Non-3GPP UE and interacts with it via Non-3GPP Message Gateway. The group creation notification includes identities belonging to different types of UEs i.e., MSGin5G UE, Legacy 3GPP UE and Non-3GPP UE.

In an embodiment, the SEAL Server (120) sends a group creation notification message to the MSGin5G Server including a list of identities belonging to different types of UEs i.e., MSGin5G UE, Legacy 3GPP UE and Non-3GPP UE. Upon receiving the group creation notification message, the MSGin5G server (VAL server) determines whether the received group creation notification message has a list of identities that belong to Legacy 3GPP UEs or Non-3GPP UEs or both. The MSGin5G server analyses a registration status of the members in the received identity list and determines if it is to be routed to a Legacy 3GPP UE or Non-3GPP UEs or both and determines that a group notification message should be sent to those UEs.

In an embodiment, upon determining that the group notification message should be sent to Legacy 3GPP UEs, the MSGin5G Server initiates the group notification message to a legacy 3GPP Message Gateway for delivery. The legacy 3GPP Message Gateway translates the group notification message to a legacy 3GPP message and sends it to a legacy 3GPP message client.

In another embodiment, upon determining that the group notification message should be sent to Non-3GPP UEs, the MSGin5G Server initiates the group notification message to a Non-3GPP Message Gateway for delivery. The Non-3GPP Message Gateway translates the group notification message to a Non-3GPP message and sends it to a Non-3GPP message client.

Thus, as seen above, the proposed method and UE (110) provides synchronization of group information between the UE (110), the VAL server (130) and the SEAL server (120) in different scenarios.

Although the FIG. 1 shows various hardware components of the UE (110), it is to be understood that other embodiments are not limited thereon. In other embodiments, the UE (110) may include less or more number of components. Further, the labels or names of the components are used only for illustrative purpose and does not limit the scope of the disclosure. One or more components can be combined together to perform same or substantially similar function to synchronization of group information between the UE (110), the VAL server (130) and the SEAL server (120).

Figure 2:
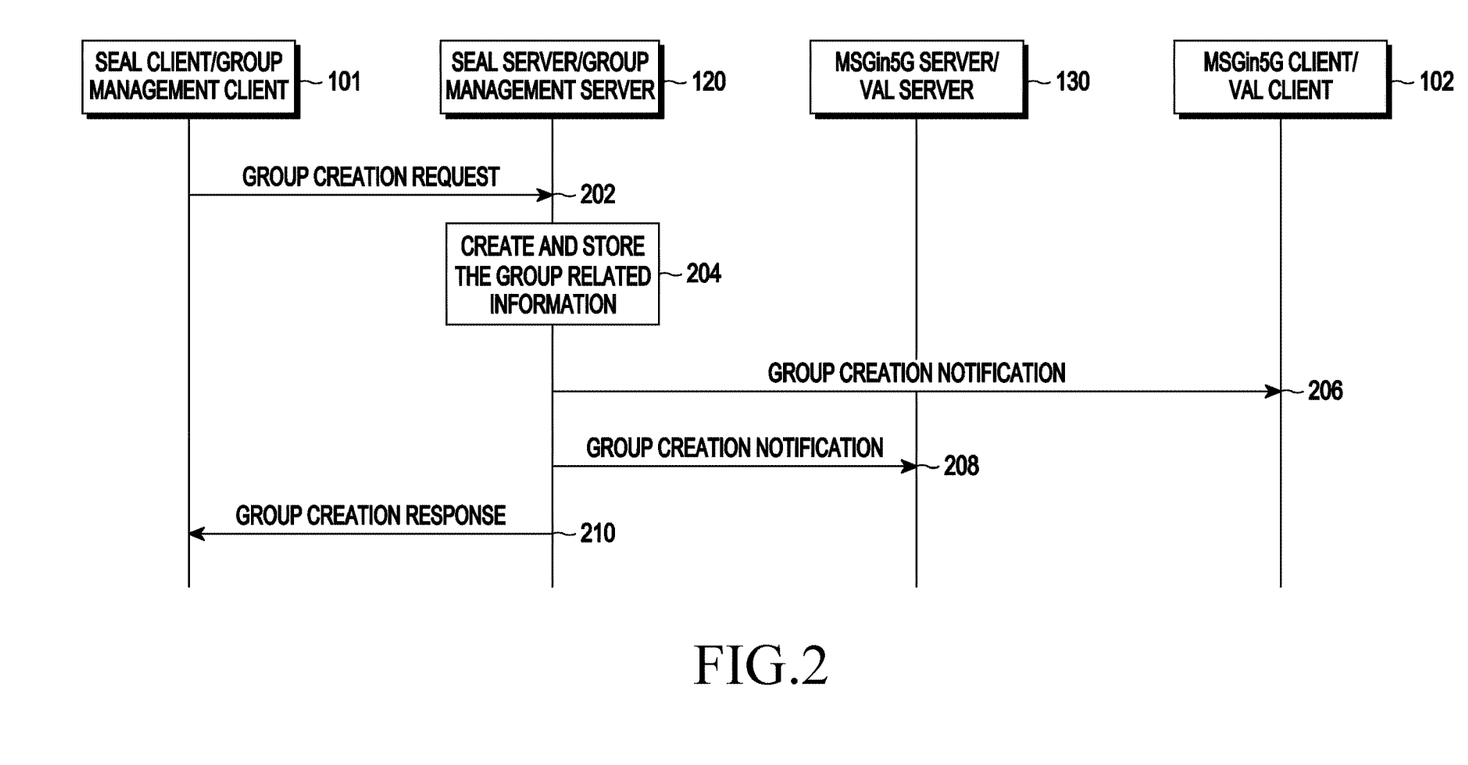
FIG. 2 is a sequence diagram, illustrating a sequence of fetching group list from the SEAL server, according to an embodiment of the disclosure.

FIG. 2 is a sequence diagram, illustrating a sequence sending group creation information to the UE (110), according to an embodiment of the disclosure.

Referring to FIG. 2, the VAL client/MSGin5G client (102) is communicating with the group management client in the SEAL client (101) and the VAL server/MSGin5G server (130), which in turn is communicating with the group management server in the SEAL server (120).

At operation 202, the group management client/SEAL client (101) of the authorized VAL user/UE (110)/administrator requests group create operation to the group management server/SEAL server (120) for creating a VAL group. The identities of the users or UEs being grouped and the information of the VAL services that are to be enabled on the group is included in group create message.

At operation 204, during the group creation, the group management server/SEAL server (120) creates and stores the information of the group. The group management server/SEAL server (120) performs a check on the policies e.g., maximum limit of the total number of VAL group members for the VAL group(s) and the like.

At operation 206, the group management server/SEAL server (120) conditionally notifies the VAL server/MSGin5G server (130) regarding the group creation with the information of the group members. In an embodiment, when the identity list comprising the list of VAL user IDs or VAL UE IDs that are part of the created group contains the list of VAL user IDs or VAL UE IDs which does not have group management client on the UE (e.g., legacy 3GPP UEs or Non-3GPP UEs), it is responsibility of the VAL server/MSGin5G server (130) to initiate the group creation notification towards those UEs. The sequence/method of initiating the group creation notification towards legacy 3GPP UEs or Non-3GPP UEs is explained in description of FIG. 4.

At operation 208, the VAL group members of the VAL group are notified about the newly created VAL group configuration data. Such notification is sent to the VAL group members having group management client.

At operation 210, the group management server/SEAL server (120) provides a group creation response to the group management client/SEAL client (101) of the administrator/authorized VAL user/UE (110).

In an embodiment, the pre-conditions for the current scenario are: the group management client/SEAL client (101), the group management server/SEAL server (120), the MSGin5G server/VAL server (130) and the VAL group members belong to the same VAL system. The authorized VAL user/UE/administrator is aware of the users' identities which will be combined to form the VAL group. Identity list that is part of the group to be created may contain the list of VAL user IDs or VAL UE IDs which does not have group management client on the UE (e.g., legacy 3GPP UEs or Non-3GPP UEs).

Thus, as seen in the above sequence, the group creation information is successfully shared with the UE (110) from the SEAL server (120).

Figure 3:
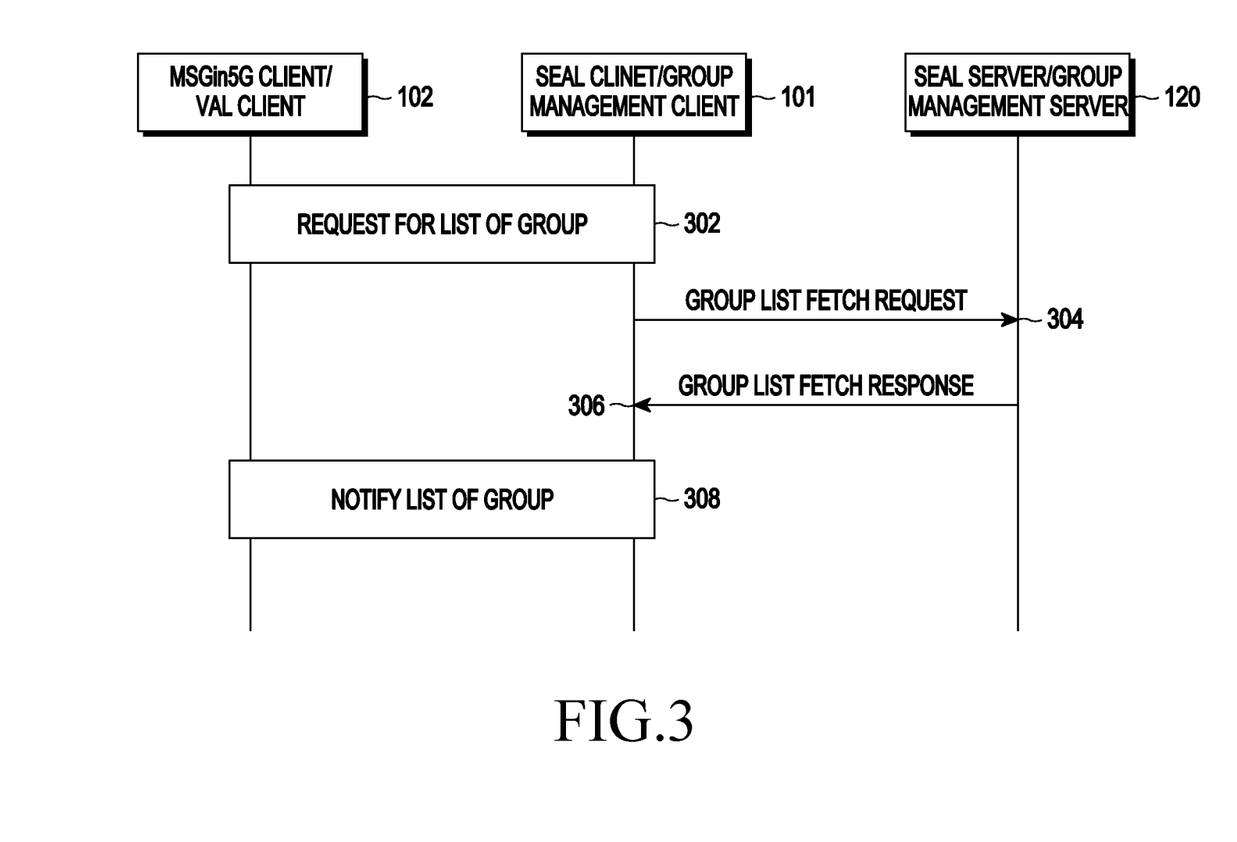
FIG. 3 is a sequence diagram, illustrating a sequence sending group creation information to the UE, according to an embodiment of the disclosure.

FIG. 3 is a sequence diagram, illustrating a sequence of fetching group list from the SEAL server (120), according to an embodiment of the disclosure.

Referring to FIG. 3, the VAL client/MSGin5G client (102) is communicating with the group management client in the SEAL client (101), which in turn is communicating with the group management server in the SEAL server (120).

At operation 302, the MSGin5G client/VAL client (102) sends the group list fetch request to the SEAL client/group management client (101). The group list fetch request is for sharing the list of groups of in which UE (110) is a member. The group list fetch request comprises an Identity (ID) of the VAL/MSGin5G UE (110) sending the request. The group list fetch request also comprises a specified period which indicates the SEAL server (120) to provide list of the groups created between the specified period. The contents of the group list fetch request is shown in table 1.

TABLE 1

| Information element | Status | Description |
| --- | --- | --- |
| Identity | M | The MSGin5G service ID (VAL user or VAL UE) performing the operation. |
| Period | O | Indicates to the group management server to provide list of the groups created between specified period. |

At operation 304, the group management client/SEAL client (101) initiates the group list fetch request towards the SEAL server/group management server (120). The information elements described in Table (1) are included in the group list fetch request sent to the SEAL server (120).

At operation 306, the SEAL server/group management server (120) checks the authorization of group list fetch request and if authorized, sends the group list fetch response containing list of groups in which the UE (110) is member. The information elements described in Table (2) are included in the group list fetch response. The table 2 comprises a UE ID/MSGin5G service of the UE (110) for whom group list fetch request is received, a list of Group service ID (VAL groups) for which the MSGin5G service ID UE (110) is member and a result indicating success or failure.

TABLE 2

| Information element | Status | Description |
| --- | --- | --- |
| Result | M | Result from the group management server in response to group list fetch request indicating success or failure |
| VAL User ID | M | The identity of the VAL User for whom this notification is targeted. |
| VAL group IDs | M | The list of VAL groups for which the VAL User is member |

At operation 308, the group management client/SEAL client (101) notifies the list of groups to the MSGin5G Client/VAL client (102).

In an embodiment, the pre-conditions for the group to be entered in the group list are as follows: The group is previously defined on the SEAL server (120) including a list of users of the group. The list of groups to which a VAL UE/VAL User belongs to is known to the SEAL server (120) for each of the VAL UE/VAL User. The MSGin5G UE (110) (i.e., VAL user) has not received group announcement message as it is offline mode.

Thus, as seen in the above sequence, the group information is successfully shared with the UE (110) from the SEAL server (120).

Figure 4:
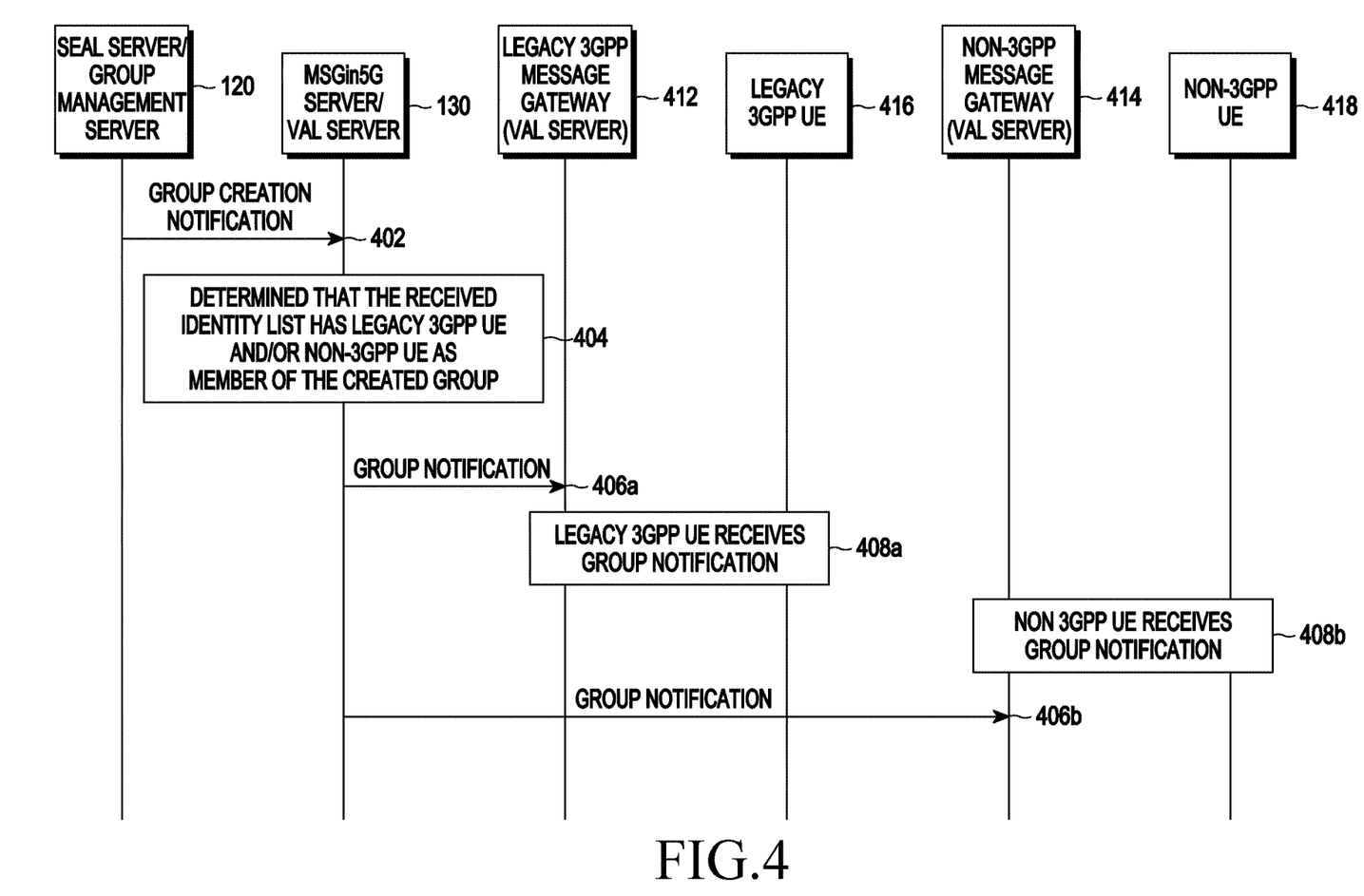
FIG. 4 is a sequence diagram, illustrating a sequence sending group creation information to the UE, when the group members are legacy 3GPP UE and non-3GPP UEs, according to an embodiment of the disclosure.

FIG. 4 is a sequence diagram, illustrating a sequence sending group creation information to the UE (110), when the group members are legacy 3GPP UE and non-3GPP UEs, according to an embodiment of the disclosure.

Referring to FIG. 4, the VAL client/MSGin5G client (102) is communicating with the VAL server/MSGin5G server (130), which in turn is communicating with the group management server in the SEAL server (120). In the embodiment, the UE (110) does not comprise the SEAL client (101) and hence the SEAL server (120) communicates with the VAL server (130) which in turn communicates with the 3GPP legacy gateway (412) the non-3GPP Message Gateway (414).

At operation 402, the SEAL Server/Group management server (120) sends a group creation notification message to the MSGin5G Server (130) including the list of identities belonging to different types of UEs i.e., MSGin5G UE, Legacy 3GPP UE and Non-3GPP UE. The contents of the group creation notification are displayed in table 2.

TABLE 3

| Information element | Status | Description |
| --- | --- | --- |
| AS service ID | M | The service identity of the application server sending the message. |
| List of MSGin5G service ID(s) | M | The service identity of the recipient Legacy 3GPP UE(s) where the notification is to be sent. |
| Message ID | M | Unique identifier of this message |
| Application ID | O | Identifies the application for which the payload is intended. |
| Group ID | M | Payload of the message containing VAL group ID that was created |
| List of members | M | List of VAL user IDs or VAL UE IDs that are part of the created group |
| Group Configuration | O | Group configuration information (NOTE) |

(NOTE):
Group configuration information can be obtained independently by MSGin5G Server (VAL server)

At operation 404, the MSGin5G server/VAL server (130) determines whether the received group creation notification message has list of identities that belong to Legacy 3GPP UEs or Non-3GPP UEs or both. The MSGin5G server (130) analyses a registration status of the members in the received identity list and determines if it is to be routed to a Legacy 3GPP UE or Non-3GPP UEs or both and that a group notification message should be sent to those UEs.

In another embodiment, SEAL Server/Group management server (120) determines whether the received group creation notification message has list of identities that belong to Legacy 3GPP UEs or Non-3GPP UEs or both. The SEAL Server/Group management server (120) analyses a registration status of the members in the received identity list and determines if it is to be routed to a Legacy 3GPP UE or Non-3GPP UEs or both and that a group notification message should be sent to those UEs.

At operation 406a, upon determining at 404 that the group notification message should be sent to Legacy 3GPP UEs, the MSGin5G Server (130) initiates the group notification message to the legacy 3GPP Message Gateway (412) for delivery. The information elements defined in Table (3) are included in the request. At operation 408a the legacy 3GPP Message Gateway (412) translates the group notification message to a legacy 3GPP message and sends it to the legacy 3GPP message client/UE (416).

In another embodiment, at operation 406b upon determining at operation 404 that the group notification message should be sent to non-3GPP UEs, the MSGin5G Server (130) initiates the group notification message to the non-3GPP Message Gateway (414) for delivery. The information elements defined in Table (4) are included in the request. At operation 408b the legacy 3GPP Message Gateway (412) translates the group notification message to a legacy 3GPP message and sends it to the legacy 3GPP message client/UE (416).

TABLE 4

| Information element | Status | Description |
| --- | --- | --- |
| AS service ID | M | The service identity of the application server sending the message. |
| MSGin5G service ID | M | The service identity of the recipient Non-3GPP UEs where the notification is to be sent. |
| Message ID | M | Unique identifier of this message |
| Application ID | O | Identifies the application for which the payload is intended. |
| Group ID | M | Payload of the message containing VAL group ID that was created |
| List of members | M | List of VAL user IDs or VAL UE IDs that are part of the created group |
| Group Configuration | O | Group configuration information (NOTE) |

The pre-condition for the current scenarios are: the MSGin5G Server (130) interacts with the Server (120) using the procedures over SEAL-S reference point. The MSGin5G Server (130) is aware of the legacy 3GPP message client in legacy 3GPP UE (416) and interacts with it via Legacy 3GPP Message Gateway (412). The MSGin5G Server is aware of the Non-3GPP message client in Non-3GPP UE (418) and interacts with it via Non-3GPP Message Gateway (414). The group creation notification includes identities belonging to different types of UEs i.e., MSGin5G UE, Legacy 3GPP UE and Non-3GPP UE.

Thus, referring to FIG. 4, the proposed method and UE (110) successfully shares the group creation information with the legacy 3GPP UE and the non-3GPP UE.

Figure 5:
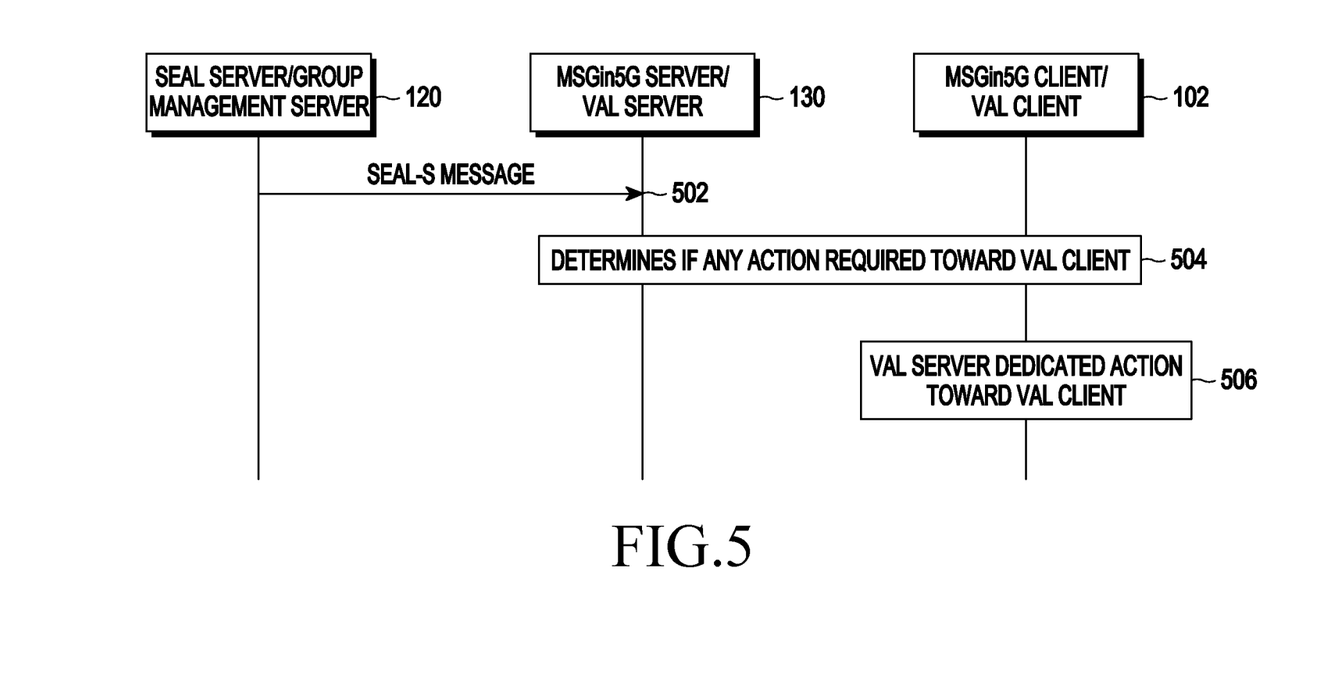
FIG. 5 is a schematic diagram, illustrating a sequence for determination of further action after receiving a SEAL-S message, according to an embodiment of the disclosure.

FIG. 5 is a schematic diagram, illustrating a sequence for determination of further action after receiving a SEAL-S message, according to an embodiment of the disclosure.

Referring to FIG. 5, the SEAL server (120) is communicating with the VAL/MSGin5G server (130), which in turn is communicating with the VAL/MSGin5G client (102).

At operation 502, the SEAL server (120) sends the SEAL-S message to the VAL server (130). At operation 504, the VAL server (130) determines if any further action is required towards the VAL client (102). At operation 506, the VAL server (130) initiates the determined action towards the VAL client (102). In an embodiment, example of further action may be notifying the VAL client (102) about formation of a new group and the like.

Figure 6:
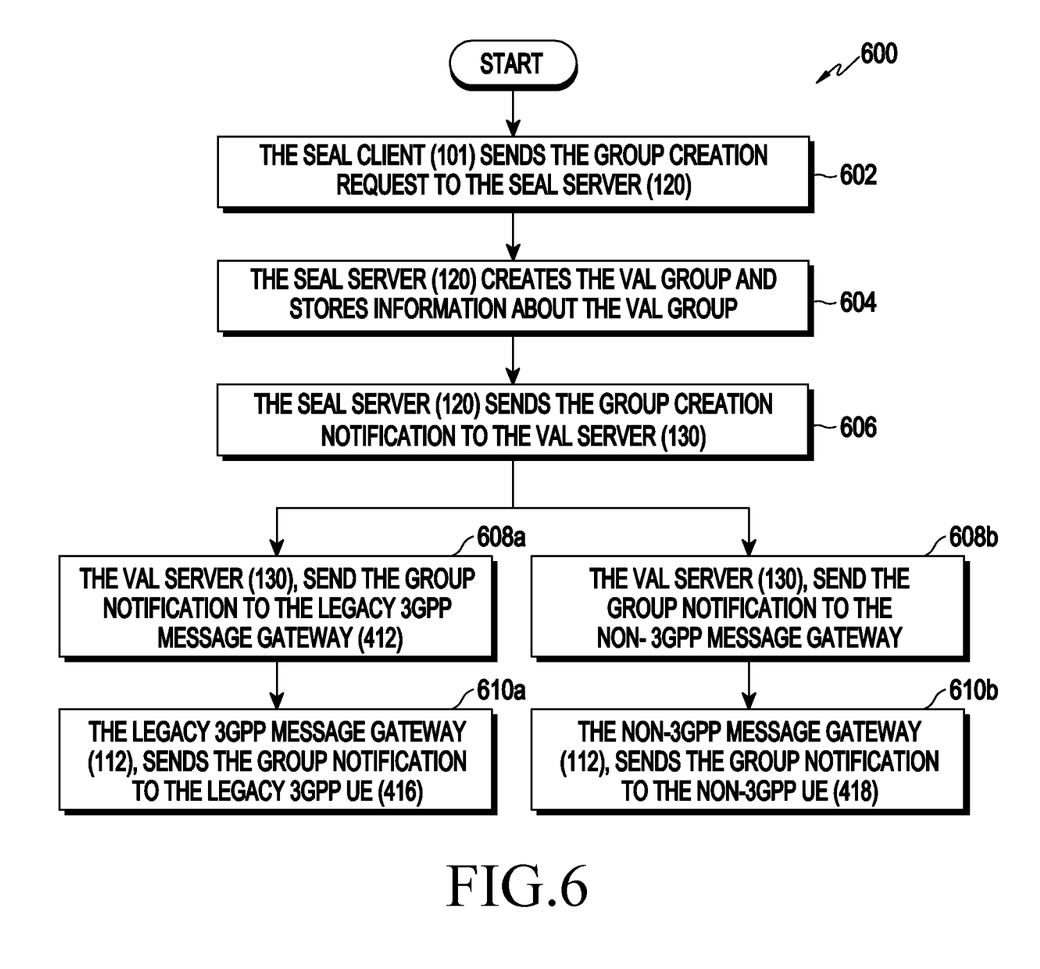
FIG. 6 is a sequence diagram, illustrating a method flow for synchronizing the group information, according to an embodiment of the disclosure.

FIG. 6 is a sequence diagram, illustrating a method flow 600 for synchronizing the group information, according to an embodiment as disclosed herein.

Referring to FIG. 6, at operation 602, the SEAL client (101) sends the group creation request to the SEAL server (120).

At operation 604, upon receiving the group creation request the SEAL server (120) creates the VAL group and stores information about the VAL group.

At operation 606, the SEAL server (120) sends the group creation notification to the VAL server (130). Further, the VAL server (130) sends the group creation notification to the VAL client (102).

In an embodiment, the VAL server determines if the identity list of group members received from the SEAL server (120) comprises legacy 3GPP UE (116) or non-3GPP UE (118).

At operation 608a, upon determining that the identity list comprises the legacy 3GPP UE (116), then the VAL server (130), send the group notification to the Legacy 3GPP message gateway (112).

At operation 610a the Legacy 3GPP Message Gateway (112), sends the group notification received from the SEAL server (120) to the legacy 3GPP UE (116).

At operation 608b, upon determining that the identity list comprises the non-3GPP UE (118), then the VAL server (130), send the group notification to the non-3GPP message gateway (114).

At operation 610b the non-3GPP Message Gateway (114), sends the group notification received from the SEAL server (120) to the non-3GPP UE (118).

The various actions, acts, blocks, operations, or the like in the flow diagram 600 may be performed in the order presented, in a different order or simultaneously. Further, in some embodiments, some of the actions, acts, blocks, operations, or the like may be omitted, added, modified, skipped, or the like without departing from the scope of the disclosure.

Figure 7:
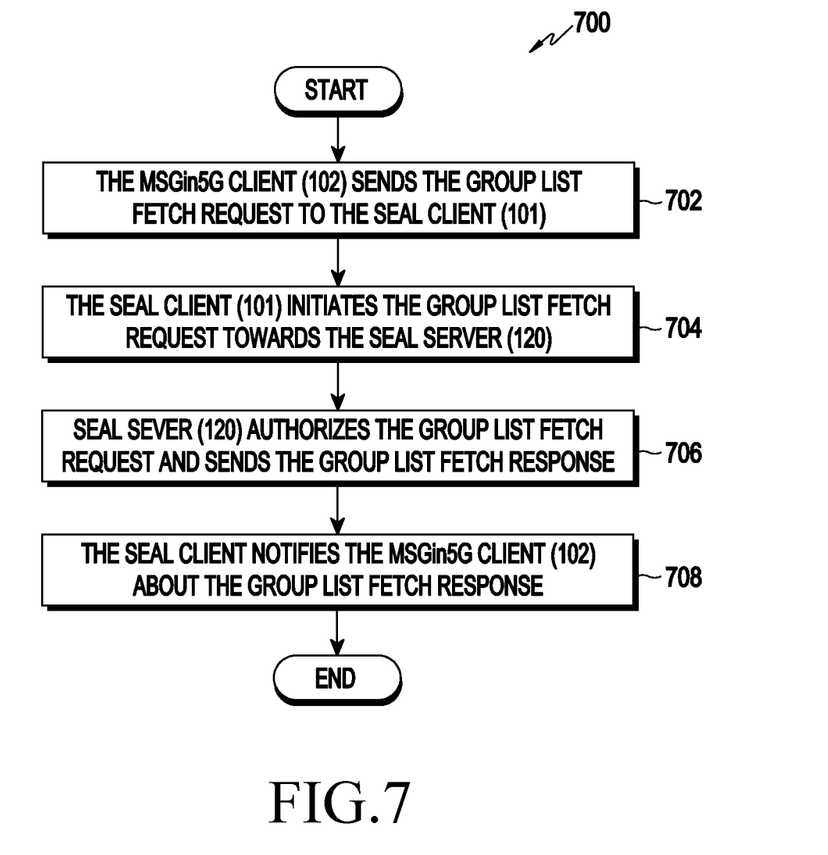
FIG. 7 is a flow diagram, illustrating a method flow for fetching group list of which the UE is a member, according to an embodiment of the disclosure.

FIG. 7 is a flow diagram, illustrating a method flow 700 for fetching group list of which the UE (110) is a member, according to an embodiment of the disclosure.

At operation 702, the MSGin5G client (102) sends the group list fetch request to the SEAL client (101) for sharing a list of groups for which the UE (110) is a member, wherein the request comprises the MSGin5G service ID.

At operation 704, the SEAL client (101) initiates the group list fetch request towards the SEAL server (120).

At operation 706, the SEAL sever (120) authorizes the group list fetch request and sends the group list fetch response comprising the list of group for which the UE (110) is the member in response to the group list fetch request, to the SEAL client (101).

At operation 708, the SEAL client notifies the MSGin5G client (102) about the group list fetch response.

The various actions, acts, blocks, operations, or the like in the flow diagram 600 may be performed in the order presented, in a different order or simultaneously. Further, in some embodiments, some of the actions, acts, blocks, operations, or the like may be omitted, added, modified, skipped, or the like without departing from the scope of the disclosure.

Forgoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a group management client for a service enabler architecture layer (SEAL) service in a wireless communication system, the method comprising:
receiving, from a vertical application layer (VAL) client, a request for a list of groups in which a VAL user equipment (UE) of the VAL client is a member;
transmitting, to a group management server for the SEAL service, a group list fetch request comprising an identity of the VAL UE;
receiving, from the group management server, a group list fetch response comprising a VAL group identifier (ID) indicating the list of the groups; and
notifying, to the VAL client, the list of the groups.

2. The method of claim 1, wherein the group list fetch response comprises a result indicating that the group list fetch request is success or failure.

3. The method of claim 1, wherein the list of the groups is defined in the group management server for the VAL UE.

4. The method of claim 1, wherein the group list fetch response comprises the identity of the VAL UE.

5. A method of a vertical application layer (VAL) client in a wireless communication system, the method comprising:
transmitting, to a group management client for a service enabler architecture layer (SEAL) service, a request for a list of groups in which a VAL user equipment (UE) of the VAL client is a member; and
receiving, from the group management client, notification of the list of the groups based on a group fetch response from a group management server for the SEAL service to the group management client,
wherein the group fetch response is in response to a group list fetch request, and
wherein the group list fetch request comprises an identity of the VAL UE, and the group list fetch response comprises a VAL group identifier (ID) indicating the list of the groups.

6. The method of claim 5, wherein the group list fetch response comprises a result indicating that the group list fetch request is success or failure.

7. The method of claim 5, wherein the list of the groups is defined in the group management server for the VAL UE.

8. The method of claim 5, wherein the group list fetch response comprises the identity of the VAL UE.

9. A group management client for a service enabler architecture layer (SEAL) service in a wireless communication system, the group management client comprising:
a transceiver; and
at least one processor coupled to the transceiver, and configured to:
receive, from a vertical application layer (VAL) client, a request for a list of groups in which a VAL user equipment (UE) of the VAL client is a member,
transmit, to a group management server for the SEAL service, a group list fetch request comprising an identity of the VAL UE,
receive, from the group management server, a group list fetch response comprising a VAL group identifier (ID) indicating the list of the groups, and
notify, to the VAL client, the list of the groups.

10. The group management client of claim 9, wherein the group list fetch response comprises a result indicating that the group list fetch request is success or failure.

11. The group management client of claim 9, wherein the list of the groups is defined in the group management server for the VAL UE.

12. The group management client of claim 9, wherein the group list fetch response comprises the identity of the VAL UE.

13. A vertical application layer (VAL) client in a wireless communication system, the VAL client comprising:
a transceiver; and
at least one processor coupled to the transceiver, and configured to:
transmit, to a group management client for a service enabler architecture layer (SEAL) service, a request for a list of groups in which a VAL user equipment (UE) of the VAL client is a member, and receive, from the group management client, notification of the list of the groups based on a group fetch response from a group management server for a SEAL service to the group management client, wherein the group fetch response is in response to a group list fetch request, and wherein the group list fetch request comprises an identity of the VAL UE, and the group list fetch response comprises a VAL group identifier (ID) indicating the list of the groups.

14. The VAL client of claim 13, wherein the group list fetch response comprises a result indicating that the group list fetch request is success or failure.

15. The VAL client of claim 13, wherein the list of the groups is defined in the group management server for the VAL UE, and wherein the group list fetch response comprises the identity of the VAL UE.

\* \* \* \* \*